US012533780B2

(12) United States Patent
Cheng

(10) Patent No.: US 12,533,780 B2
(45) Date of Patent: Jan. 27, 2026

(54) TRANSMISSION STRUCTURE OF ELECTRIC NAIL GUN

(71) Applicant: ANN-CHAIN ENTERPRISE CO., LTD., Changhua (TW)

(72) Inventor: Hui-Cheng Cheng, Changhua (TW)

(73) Assignee: ANN-CHAIN ENTERPRISE CO., LTD., Changhua (TW)

( * ) Notice: Subject to any disclaimer, the term of this patent is extended or adjusted under 35 U.S.C. 154(b) by 0 days.

(21) Appl. No.: 18/649,192

(22) Filed: Apr. 29, 2024

(65) Prior Publication Data

US 2025/0332701 A1 Oct. 30, 2025

(51) Int. Cl.
*B25C 1/06* (2006.01)

(52) U.S. Cl.
CPC .................................... *B25C 1/06* (2013.01)

(58) Field of Classification Search
CPC .. B25C 1/06; B25C 1/04; B25C 1/047; B25C 1/00; B25C 1/005; B25C 1/041; B25C 5/00; B25C 5/10; B25C 5/13; B25C 5/15; B25C 5/161; B25C 5/1644; B25B 27/146; B25B 21/00; B25B 21/002; B25B 21/02; B25B 21/023; B25B 23/0064; B25B 23/045; B25B 23/06; B25B 27/0085; Y10T 29/53783; Y10T 29/53513; Y10T 29/49908; Y10T 29/53522; B25F 5/02; B25F 5/006; B25F 3/00; B25F 5/005; F16B 15/0015; F16B 15/06; F16B 15/08; F16B 2/26
See application file for complete search history.

(56) References Cited

U.S. PATENT DOCUMENTS

| | | | | |
|---|---|---|---|---|
| 11,872,679 | B1 | 1/2024 | Cheng | |
| 2014/0360243 | A1 * | 12/2014 | MacAdams | B21D 39/048 72/407 |
| 2022/0281089 | A1 * | 9/2022 | Yamashita | B25B 23/0064 |

FOREIGN PATENT DOCUMENTS

| | | |
|---|---|---|
| TW | I603818 | 11/2017 |

* cited by examiner

*Primary Examiner* — Veronica Martin
(74) *Attorney, Agent, or Firm* — MUNCY, GEISSLER, OLDS & LOWE, P.C.

(57) ABSTRACT

A transmission structure of an electric nail gun, configured to drive a push block moving linearly by a rotational power of a torsion rod. The transmission structure includes a base, at least one linear guide element, a transmission element, and a screw rod, wherein the at least one linear guide is provided with a linear groove. The transmission element includes a first end, a second end, and an intermediate part. The first end is fixed to the push block, and the intermediate part is between the first end and the second end, and the intermediate part is fixed with at least one protruding post that extends into and is restricted from sliding on the linear groove. The screw rod is fixed on the torsion rod and is driven by the torsion rod to rotate in place.

4 Claims, 3 Drawing Sheets

TRANSMISSION STRUCTURE OF ELECTRIC NAIL GUN

FIELD OF THE INVENTION

The invention relates to an electric nail gun, especially a transmission structure of electric nail gun.

BACKGROUND OF THE INVENTION

A nail gun is a tool used in construction and decoration. The nail gun is used to fire nails to connect different workpieces together. Conventional nail guns, such as "Nail Kit Assembly and Nail Gun Containing the Nail Kit Assembly" in Taiwan Patent No. 1603818, disclose a nail kit assembly and a nail gun including the nail kit assembly.

For wire construction objects such as spring beds, light steel frames, etc., a C-type nail gun will be used to complete the bundling of different linear materials. A conventional C-type nail gun, as shown in the "Pneumatic Tool Nail Gun" in U.S. Pat. No. 11,872,679 B1, can form a strip nail into a cross-end buckle, which can be used for binding spring beds and light steel frames. And other construction objects, it is also suitable for load-bearing application places.

The above-mentioned C-type nail gun is pneumatic and mainly uses the air pressure difference to push a driving rod to be displaced. The driving rod will drive a push block to move and drive a nail-forming device to form the strip nail into the buckle, which cannot be used in places where there is no air compressor.

If a pneumatic power is directly changed to an electric power, a motor outputs a rotational power through a torsion rod since the power source of the electric power is the motor, the rotational power needs to pass through a screw structure to drive a transmission element to linearly displacement, and the transmission element will drive the pushing block moves to drive the nail forming device. However, when the screw structure rotates, a lateral force will be generated on the transmission element. When the transmission element is subjected to the lateral force, a linear stability of moving the transmission element will be affected, thereby reducing the service life.

SUMMARY OF THE INVENTION

A main object of the invention is to disclose a transmission structure of an electric nail gun that can resist and eliminate a lateral force generated on a transmission element when a screw rod rotates, so as to increase a linear stability during movement.

In order to achieve the above object, the invention provides a transmission structure of an electric nail gun drives a push block moving linearly by a rotational power of a torsion rod, including a base, at least one linear guide element, a transmission element, and a screw rod, wherein the at least one linear guide is provided with a linear groove. The transmission element includes a first end, a second end, and an intermediate part. The first end is fixed to the push block, and the intermediate part is between the first end and the second end, and the intermediate part is fixed with at least one protruding post that extends into and is restricted from sliding on the linear groove. The screw rod is fixed on the torsion rod and is driven by the torsion rod to rotate in place, and the screw rod spirally penetrates into the transmission element and drives the transmission element moving linearly.

Accordingly, the transmission element of the invention is constrained by the at least one linear guide element through the at least one protruding post extending into the linear groove, so as to be able to resist and eliminate a lateral force generated by a rotation of the screw rod, so that the transmission element is not deflected during moving linearly, and to increase the linear stability of the transmission element upon moving.

DETAILED DESCRIPTION OF THE PREFERRED EMBODIMENTS

The detailed description and technical content of the invention are described below with reference to the accompanying drawings.

Figure 1:
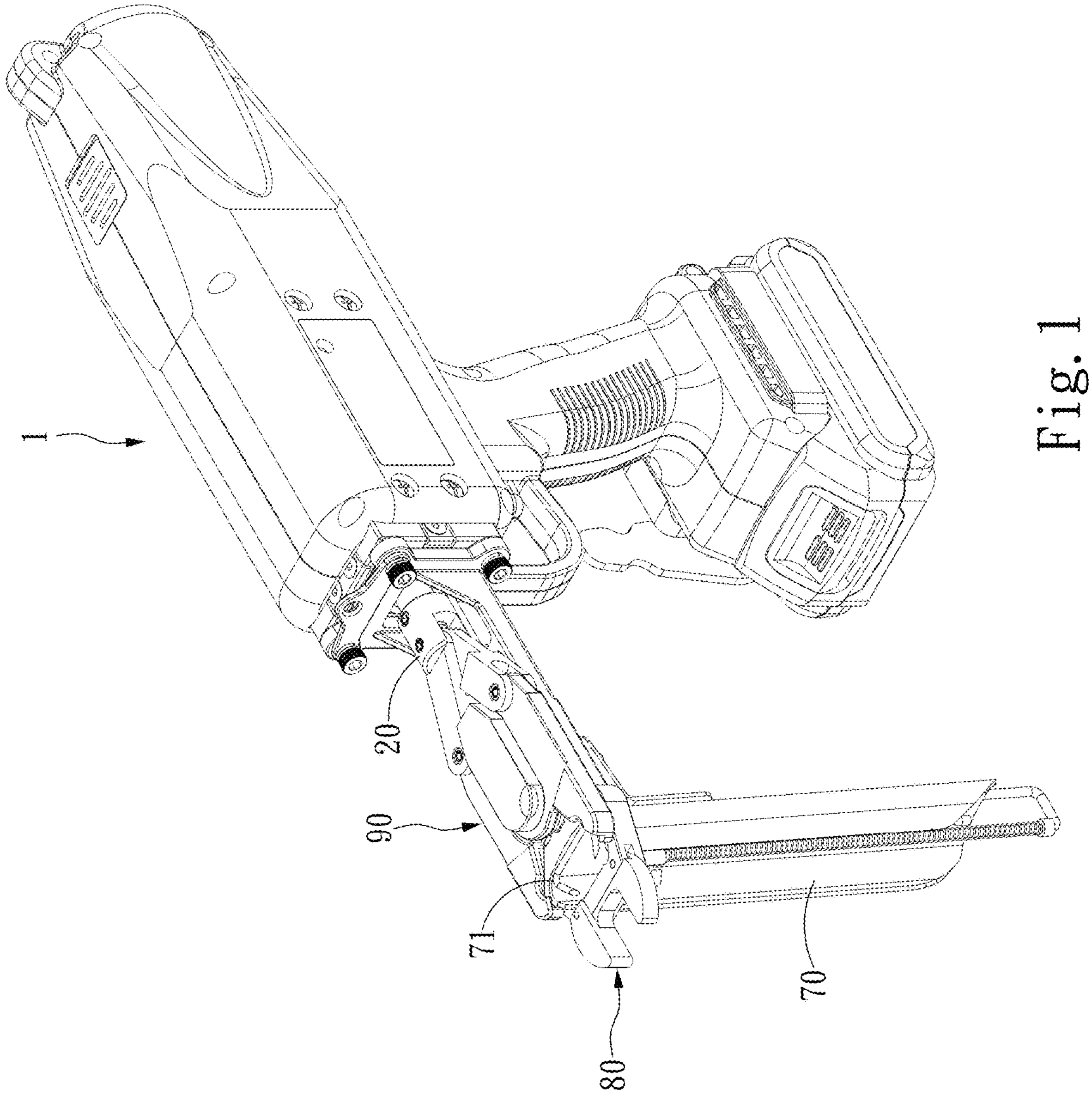
FIG. 1 is a perspective structural view of the invention applied to an electric nail gun.
Figure 2:
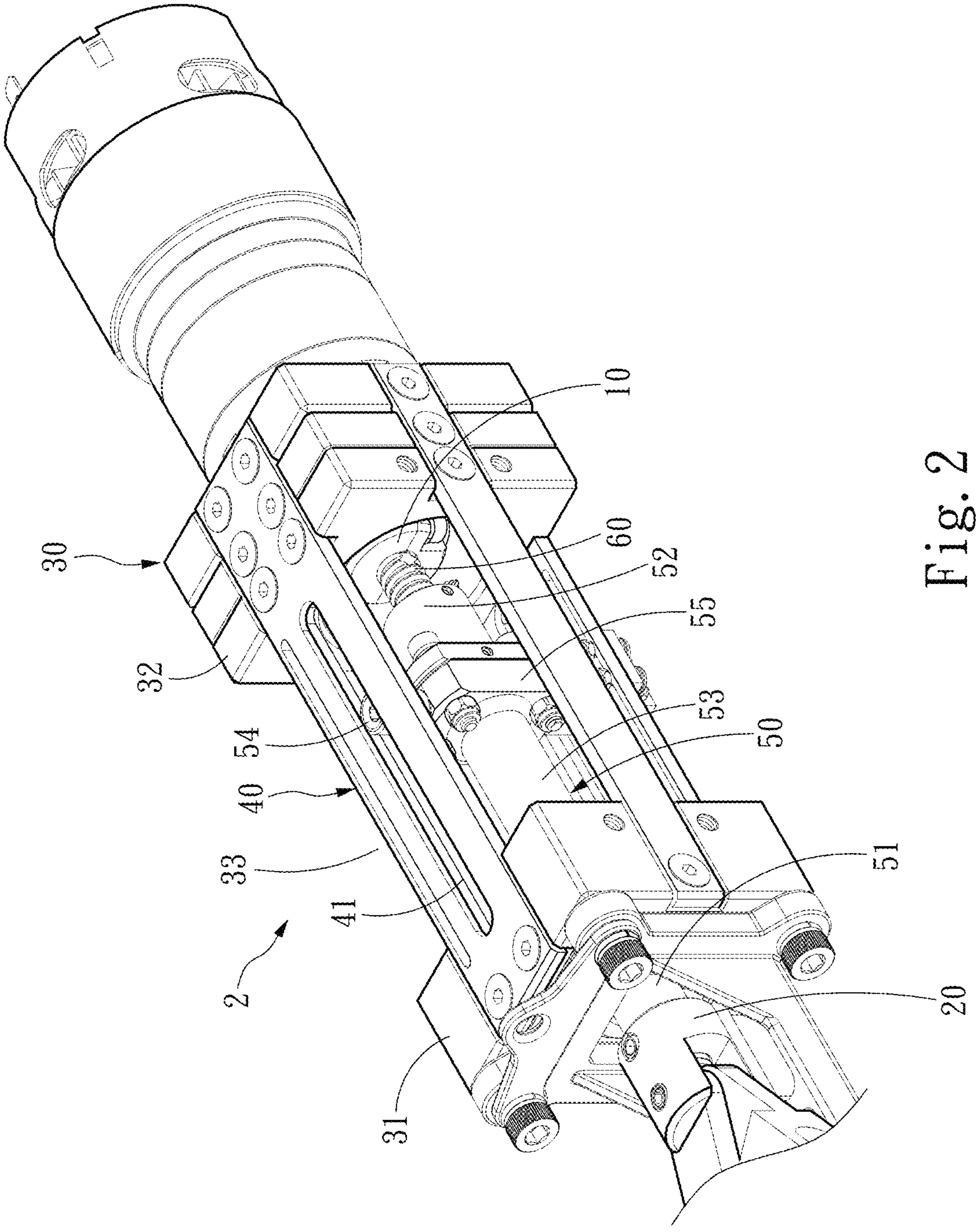
FIG. 2 is a perspective schematic diagram of a transmission structure of the invention.
Figure 3:
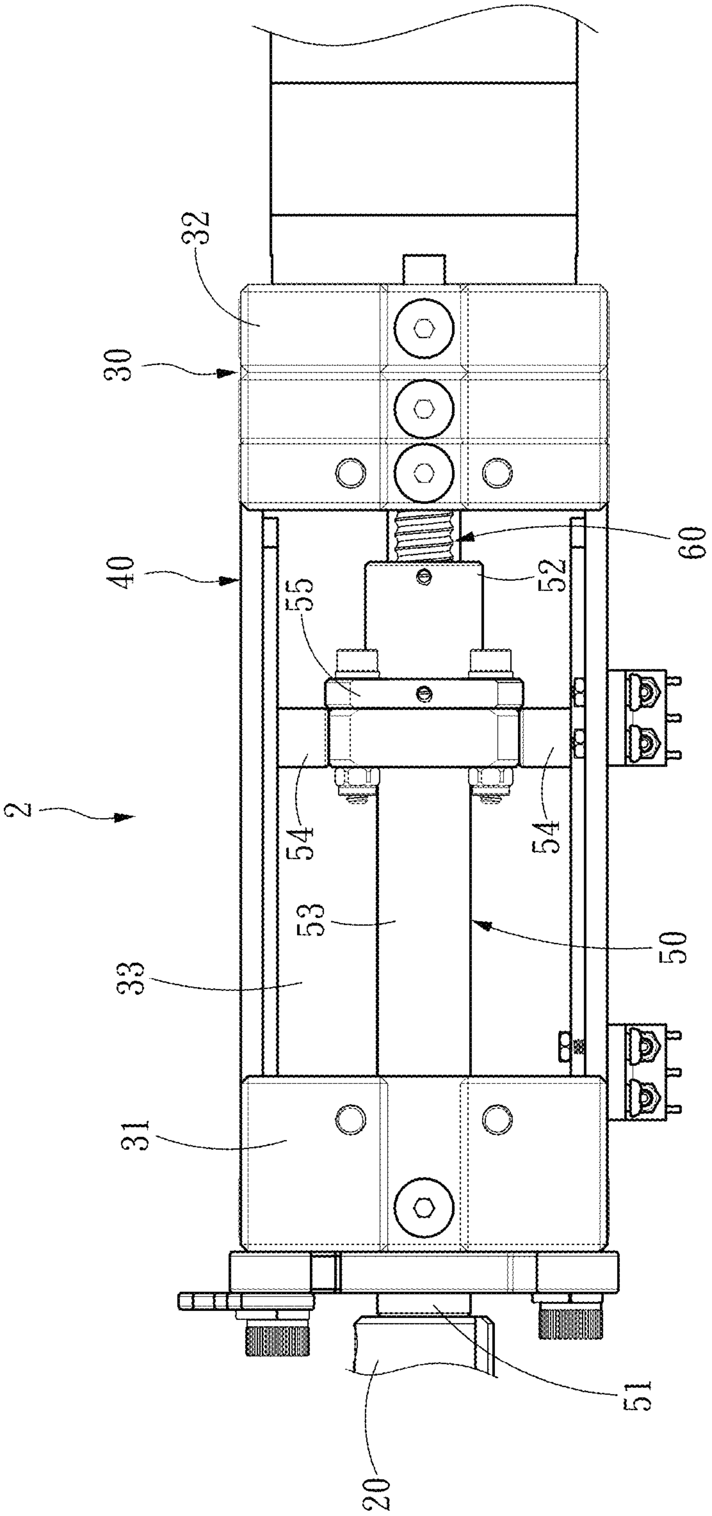
FIG. 3 is a schematic side view of a transmission structure of the invention.

Please refer to FIG. 1, FIG. 2, and FIG. 3. The invention provides a transmission structure 2 applied to an electric nail gun 1, the transmission structure 2 drives a push block 20 to move linearly through a rotational power of a torsion rod 10. The transmission structure 2 includes a base 30, at least one linear guide element 40, a transmission element 50 and a screw rod 60.

The at least one linear guide element 40 is fixed to the base 30, and the at least one linear guide element 40 includes a linear groove 41. Preferably, a number of at least one linear guide element 40 is multiple, and the linear guide elements 40 are symmetrically fixed to the base 30. In one embodiment, the base 30 is provided with a first mounting base 31 and a second mounting base 32. The first mounting base 31 and the second mounting base 32 are separated by a sliding space 33, two ends of the at least one linear guide elements 40 are respectively fixed to the first mounting base 31 and the second mounting base 32.

The transmission element 50 is provided with a first end 51, a second end 52 and an intermediate part 53. The first end 51 is fixed to the push block 20, and the intermediate part 53 is between the first end 51 and the second end 52, and the intermediate part 53 is fixed with at least one protruding post 54 that extends into and is restricted from sliding on the linear groove 41. Preferably, the at least one protruding post 54 is fixed on the intermediate part 53 through at least one locking ring 55, and numbers of the at least one linear guide element 40 and the at least one protruding post 54 are two respectively, and two linear guide elements 40 are respectively fixed on lower surfaces and upper surfaces of the first mounting base 31 and the second mounting base 32, and two protruding posts 54 are respectively penetrated into two linear grooves 41 of the two linear guide elements 40.

The screw rod 60 is fixed on the torsion rod 10 and is driven by the torsion rod 10 to rotate in place. The screw rod 60 spirally penetrates into the second end 52 of the transmission element 50 to drive the transmission element 50 moving linearly.

In one embodiment, the invention is further used with a nail kit 70, a shaped front fork 80 and a nail forming device 90, wherein the nail kit 70 is provided for placing a plurality of strip nails 71 (only one is shown in the figure). A linear movement of the transmission element 50 drives the push block 20 to move, and the nail forming device 90 is driven by moving the push block 20, so that the plurality of strip nails 71 are pushed to the shaped front fork 80, ends of the plurality of strip nails 71 are in a form of crossed buckles (not shown) in coordination with the shaped front fork 80.

Through the foregoing implementation of the invention, compared with the prior art, the invention has the following characteristics:

1. The transmission element is constrained by the at least one linear guide element through the at least one protruding post extending into the linear groove, so as to be able to resist and eliminate a lateral force generated by a rotation of the screw rod, so that the transmission element is not deflected during moving linearly, and to increase the linear stability of the transmission element upon moving.
2. The at least one linear guide element is symmetrically fixed on the base to increase the stability of the overall structure.
3. The at least one protruding post is fixed on the intermediate part through the at least one locking ring, and a number of the at least one protruding post can be increased or reduced according to the needs of use.

What is claimed is:

1. An electric nail gun, comprising:

a body, comprising a case, a torsion rod, a push block, and a transmission structure respectively connected to the torsion rod and the push block at two ends, the torsion rod and the transmission structure provided in the case, the push block located at one opening of the case, wherein the transmission structure comprising:

a base, arranged in the case, comprising a first mounting base and a second mounting base, wherein the first mounting base and the second mounting base are separated by a sliding space;

at least one linear guide element, comprising a linear groove, wherein two ends of the at least one linear guide element are respectively fixed to the first mounting base and the second mounting base of the base;

a transmission element, comprising a first end, a second end, and an intermediate part, the first end fixed to the push block, the intermediate part being between the first end and the second end, and the intermediate part fixed with at least one protruding post extending into the linear groove and being constrained to slide along the linear groove while being restricted from a lateral displacement; and a screw rod, fixed on the torsion rod and driven by the torsion rod to rotate in place, and the screw rod spirally penetrating into the second end of the transmission element to drive the transmission element moving linearly;

a nail forming device, fixed on the body and connected to the push block;

a shaped front fork, fixed on the nail forming device; and a nail kit, fixed on the shaped front fork, and provided for placing a plurality of strip nails;

wherein, the transmission structure configured to drive the push block to move linearly through a rotational power of a torsion rod, and the push block configured to drive the nail forming device to push one of the plurality of strip nails in the nail kit to the shaped front fork, and the shaped front fork configured to form a buckle by crossing two ends of one of the plurality of strip nails.

2. The transmission structure of the electric nail gun as claimed in claim 1, wherein a number of at least one linear guide element is multiple, and the linear guide elements are symmetrically fixed on the base.

3. The transmission structure of the electric nail gun as claimed in claim 1, wherein numbers of the at least one linear guide element and the at least one protruding post are two respectively, and the two linear guide elements are respectively fixed on lower surfaces and upper surfaces of the first mounting base and the second mounting base, and the two protruding posts are respectively penetrated into two linear grooves of the two linear guide elements.

4. The transmission structure of the electric nail gun as claimed in claim 1, wherein the at least one protruding post is fixed on the intermediate part through at least one locking ring.

* * * * *